(12) United States Patent
Zhao et al.

(10) Patent No.: US 11,501,187 B2
(45) Date of Patent: Nov. 15, 2022

(54) OPINION SNIPPET DETECTION FOR ASPECT-BASED SENTIMENT ANALYSIS

(71) Applicant: International Business Machines Corporation, Armonk, NY (US)

(72) Inventors: Shiwan Zhao, Beijing (CN); Meng Ting Hu, Tongchuan (CN); HongLei Guo, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 16/579,972

(22) Filed: Sep. 24, 2019

(65) Prior Publication Data

US 2021/0089936 A1   Mar. 25, 2021

(51) Int. Cl.
G06F 17/20   (2006.01)
G06N 5/04   (2006.01)
G06N 20/00   (2019.01)
G06F 40/30   (2020.01)

(52) U.S. Cl.
CPC .............. *G06N 5/04* (2013.01); *G06F 40/30* (2020.01); *G06N 20/00* (2019.01)

(58) Field of Classification Search
CPC ...... G06N 5/04; G06N 20/00; G06F 17/2785; G06F 30/20; G06F 17/30752; G06F 40/30
USPC .......................................................... 704/9
See application file for complete search history.

(56) References Cited

U.S. PATENT DOCUMENTS

| | | | |
|---|---|---|---|
| 9,690,772 B2 | 6/2017 | Brun | |
| 2014/0088944 A1* | 3/2014 | Natarajan | G06F 17/5009 703/13 |
| 2018/0053107 A1 | 2/2018 | Wang | |
| 2019/0012381 A1* | 1/2019 | Debique | G06F 17/30752 |
| 2020/0167419 A1* | 5/2020 | He | G06F 17/2785 |
| 2020/0401661 A1* | 12/2020 | Kota | G06F 17/2785 |

OTHER PUBLICATIONS

Huang et al., Aspect Level Sentiment Classification With Attention-Over-Attention Neural Networks, Apr. 18, 2018, <https://www.groundai.com/project/aspect-level-sentiment-classification-with-attention-over-attention-neural-networks/>, 8 pages.

Tay et al., "Learning to Attend via Word-Aspect Associative Fusion for Aspect-Based Sentiment Analysis", The Thirty-Second AAAI Conference on Artificial Intelligence (AAAI-18), Copyright 2018, Association for the Advancement of Artificial Intelligence, 8 pages.

(Continued)

*Primary Examiner* — Md S Elahee
(74) *Attorney, Agent, or Firm* — Stephanie L. Carusillo (57) ABSTRACT

A computer implemented method, computer system and computer program product are provided for aspect-based sentiment analysis. According to the method, at least one sentence and at least one aspect are received by one or more processing units. At least one opinion snippet of the at least one sentence is determined based on the at least one sentence and the at least one aspect, through a trained aspect-sentence fusion model, by one or more processing units. A sentiment prediction of the at least one opinion snippet is calculated by one or more processing units for the at least one aspect.

14 Claims, 5 Drawing Sheets

(56) References Cited

OTHER PUBLICATIONS

Wang et al., "Attention-based LSTM for Aspect-level Sentiment Classification", Proceedings of the 2016 Conference on Empirical Methods in Natural Language Processing, pp. 606-615, Austin, Texas, Nov. 1-5, 2016. Copyright 2016 Association for Computational Linguistics, 10 pages.

Mell et al., "The NIST Definition of Cloud Computing", National Institute of Standards and Technology U.S. Department of Commerce, Special Publication 800-145, Sep. 2011, 7 pages.

* cited by examiner

OPINION SNIPPET DETECTION FOR ASPECT-BASED SENTIMENT ANALYSIS

BACKGROUND

The present invention relates to data processing, and more specifically to opinion snippet detection for aspect-based sentiment analysis.

Aspect-based sentiment analysis (ABSA) is used to predict a sentiment polarity towards a particular aspect in a sentence. The term aspect means attributes or components of a product or service, and this task has been widely addressed by the neural attention mechanism, which computes attention weights to softly select words for generating aspect-specific sentence representations.

SUMMARY

This summary is provided to introduce a selection of concepts in a simplified form that are further described herein in the detailed description. This summary is not intended to identify key factors or essential features of the claimed subject matter, nor is it intended to be used to limit the scope of the claimed subject matter.

According to one embodiment of the present invention, there is provided a computer-implemented method. According to the method, at least one sentence and at least one aspect are received by one or more processing units. And at least one opinion snippet of the at least one sentence is determined based on the at least one sentence and the at least one aspect, through a trained aspect-sentence fusion model, by one or more processing units. And a sentiment prediction of the at least one opinion snippet is calculated by one or more processing units for the at least one aspect.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
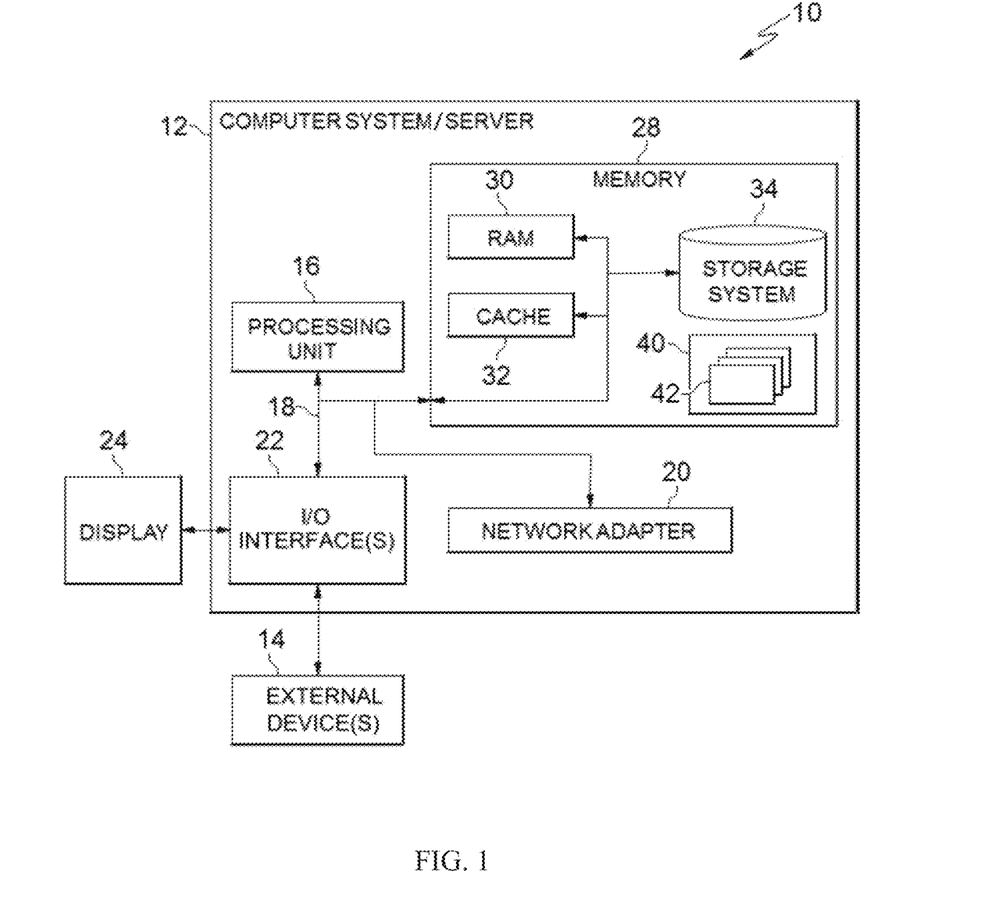
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
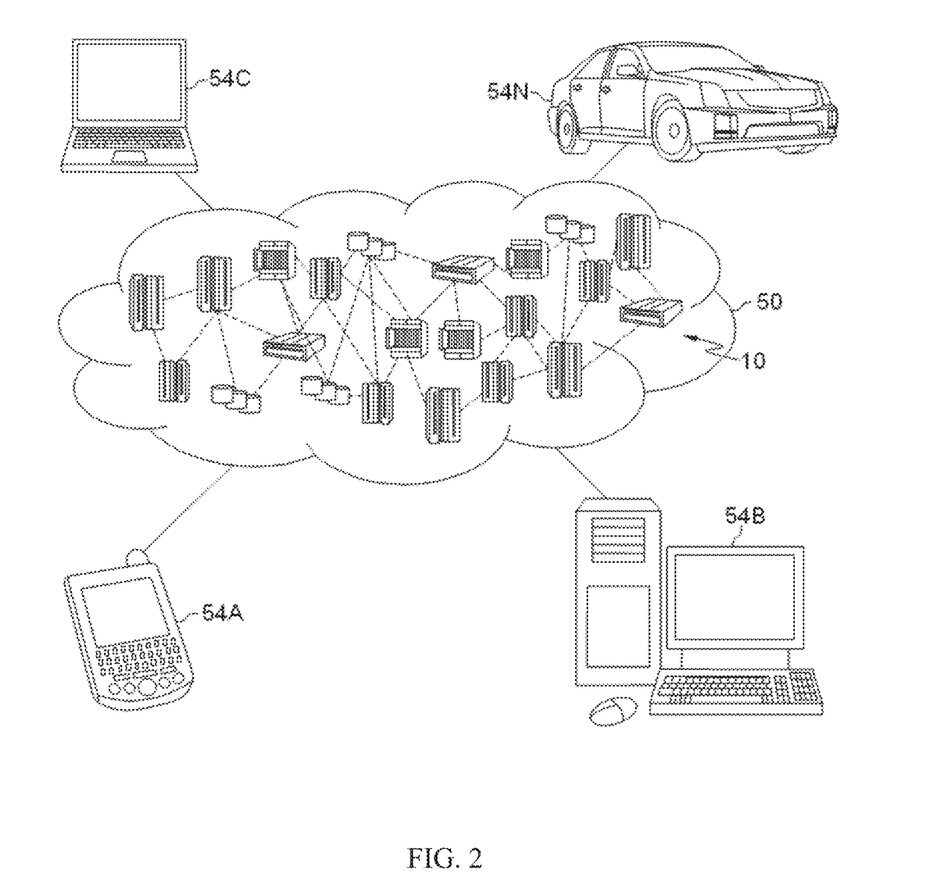
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
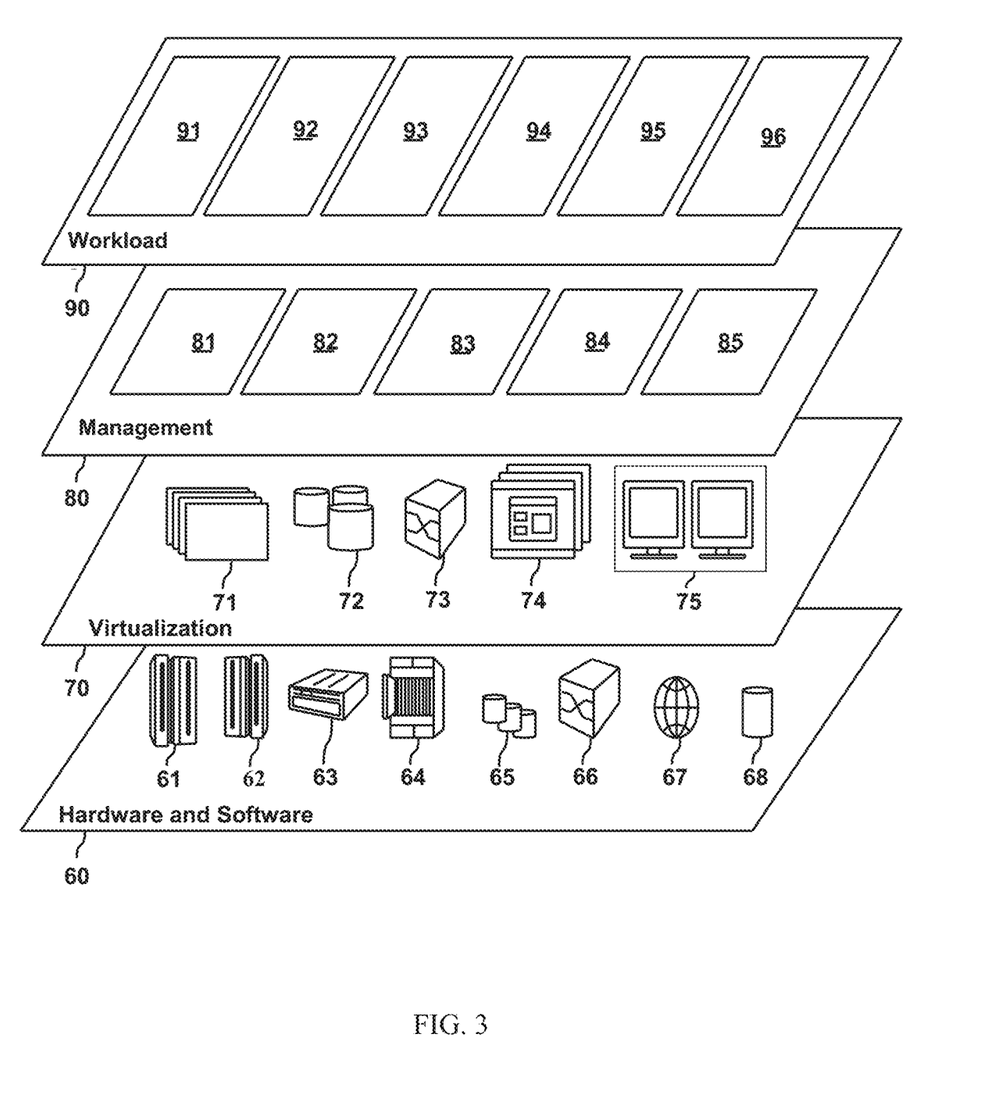
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sentiment analysis 96.

Figure 4:
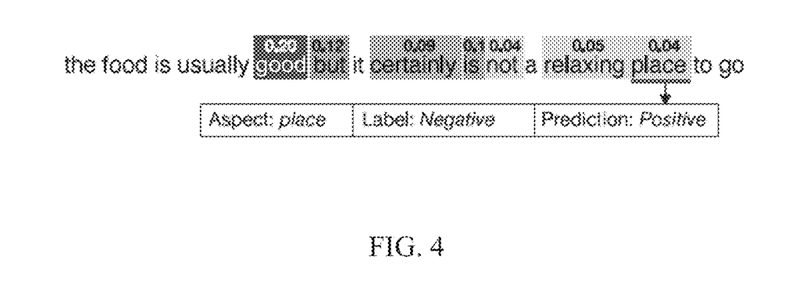
FIG. 4 depicts an example diagram of attention visualization for a sentence based on the model attention-based long short-term memory with aspect embedding (ATAE-LSTM).

ABSA is becoming more and more popular. Some attention-based methods can be categorized as soft-selection approaches since the attention weights scatter across the whole sentence with every word of the sentence is taken into consideration with different weights. This usually results in attention distraction, i.e., attention on noisy or misleading words, or opinion words from other aspects. Taking FIG. 4 as an example, FIG. 4 depicts an example diagram of attention visualization based on Attention-Based Long Short-Term Memory with Aspect Embedding (ATAE-LSTM) model, which utilizes the attention mechanism to produce an aspect-specific sentence representation and concatenates the aspect embedding to each word embedding as the feed to LSTM. For the aspect place in the sentence "the food is usually good, but it certainly is not a relaxing place to go", FIG. 4 visualizes the attention weights obtained from the model ATAE-LSTM. As shown in FIG. 4, the words "good" and "but" are dominant in attention weights. However, "good" is used to describe the aspect "food" rather than place, "but" is not so related to place either. The true opinion snippet "certainly is not a relaxing place" receives low attention weights, leading to the wrong sentiment prediction towards the aspect place as positive.

Therefore, the present disclosure will provide a method to solve this problem by determining at least one opinion snippet of at least one sentence for sentiment prediction. The term opinion snippet means a snippet of opinion words in a sentence. Particularly, the present disclosure proposes an alternative hard-selection approach by determining two positions in the sentence and selecting words between these two positions as the opinion expression of a given aspect. This is also based on the observation that opinion words of a given aspect are usually distributed consecutively as a snippet. As a consecutive whole, the opinion snippet may gain enough attention weights and avoid being distracted by other noisy or misleading words or distant opinion words from other aspects. Then, the present disclosure predicts the sentiment polarity of the given aspect based on the average of the extracted opinion snippet. The explicit selection of the opinion snippet also brings another advantage that it can serve as justifications of the sentiment predictions making the model more interpretable.

Figure 5:
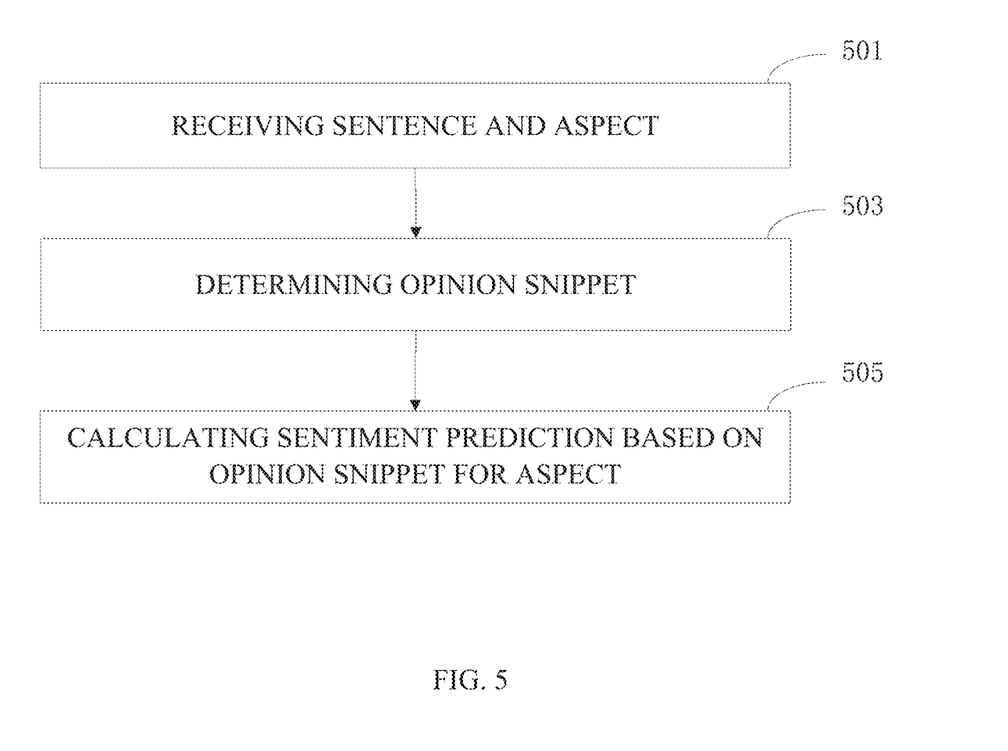
FIG. 5 depicts an example flowchart of a method for determining a snippet for sentiment analysis according to an embodiment of the present invention.

FIG. 5 depicts an example flowchart of a method for determining a snippet for sentiment analysis, according to an embodiment of the present invention. At block 501, at least one sentence and at least one aspect are received by one or more processing units. As has been detailed above, the at least one sentence comprises some words, and the aspect may be an aspect category or concept (e.g. price, service, etc.), which usually is not included in the at least one sentence, or aspect terms, which are a snippet of words contained in the sentence (e.g. place, laptop battery, etc.).

At block 503, at least one opinion snippet of the at least one sentence is determined, by one or more processing units, based on the at least one sentence and the at least one aspect through a trained aspect-sentence fusion model. Rather than considering all the words included in the sentence, according to one embodiment of the present invention, only the at least one opinion snippet is considered. Those skilled in the art may leverage any proper trained aspect-sentence fusion model, such as Bidirectional Encoder Representations from Transformers (BERT), word-aspect fusion attention layer (WAFAL), etc. According to one embodiment of the present invention, the at least one sentence and the at least one aspect are fed into the trained aspect-sentence fusion model, and at least one word-aspect fusion result may be obtained.

According to another embodiment of the present invention, the start position of the at least one opinion snippet in the at least one sentence is determined based on the at least one word-aspect fusion result, and the end position of the at least one opinion snippet in the at least one sentence is determined based on the determined start position. According to another embodiment of the present invention, a multinomial distribution is computed as a dot product between the at least one word-aspect fusion result and a trained start vector followed by a softmax over all of the words of the at least one sentence, and the start position is sampled based on the multinomial distribution. According to one embodiment of the present invention, the trained start vector is learned through a reinforcement learning based on training data with sentences, aspects, and correspondent labeled sentiment classifications. According to one embodiment of the present invention, the end position is determined by sampling the end position in the later part of the at least one sentence after the start position of the at least one sentence. More embodiments of the present invention will be described in the following paragraphs for determining the at least one opinion snippet of the at least one sentence.

Referring back to FIG. 5, at block 505, a sentiment prediction of the at least one opinion snippet for the at least one aspect may be calculated by one or more processing units. According to one embodiment of the present invention, an average representation of the at least one opinion snippet is obtained, and the sentiment prediction is calculated based on the average representation.

For a better understanding of the present invention, embodiments of the present invention will be described in the following paragraphs based on BERT. Although BERT is used to explain the sentiment analysis, it should be clear to those skilled in the art that the following description is merely for the purpose of simplifying illustration and will not adversely limit the scope of the disclosure. Those skilled in the art can leverage the present disclosure for any proper kind of word-aspect fusion model.

Figure 6:
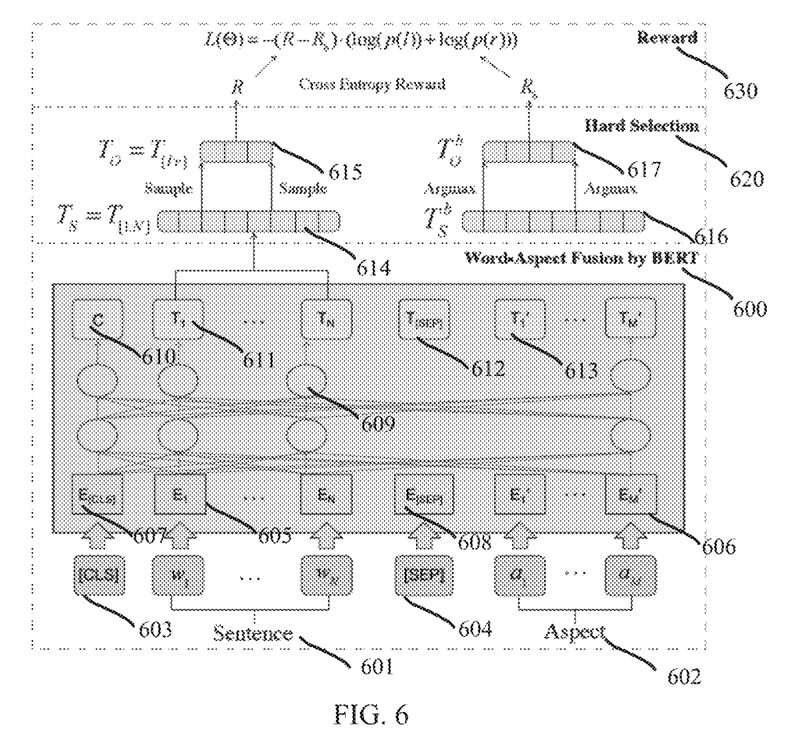
FIG. 6 depicts an example diagram for determining a snippet for sentiment analysis based on bidirectional encoder representations from transformers (BERT) according to an embodiment of the present invention.

FIG. 6 depicts an example diagram for determining a snippet for sentiment analysis based on BERT, according to an embodiment of the present invention. It should be pointed out that the BERT is only for a better understanding of the present invention, and thus will not adversely limit the scope of the invention.

In order to accurately determine the start/end positions of the opinion snippet of a particular aspect, first, the deep associations between the sentence and aspect and the long-term dependencies within the sentence need to be modeled by BERT, which is a pre-trained language model. Second, with the contextual representations from BERT, the two positions are sequentially determined by self-critical reinforcement learning. The reason for using reinforcement learning is that reinforcement learning does not have the ground-truth positions of the opinion snippet, but only the polarity of the corresponding aspect. Then, the extracted opinion snippet is used for sentiment classification. The details are described in following paragraphs.

First, the problem to be solved needs to be formulated mathematically. A sentence 601 and an aspect 602 is provided as an example, wherein $w_1, w_2, \ldots, w_N$ are the words of the sentence in the reading order, N is the number of words of the sentence, and $a_1, a_2, \ldots, a_M$ are the words of the aspect in the reading order, wherein M is the number of the words of the aspect. The ABSA task is to predict the sentiment of the aspect A in the sentence S. According to embodiments of the present disclosure, the aspect can be either aspect terms or an aspect category. As aspect terms, A is a snippet of words in S, i.e., a sub-sequence of the sentence S, while as an aspect category, A represents a semantic category with M=1, containing just an abstract token, and A usually isn't included in the sentence S. It should be pointed out that the embodiment of one sentence and one aspect are only for a better understanding of the present invention thus will not adversely limit the scope of the invention. A plurality of sentences and aspects could be fed.

According to one embodiment of the present disclosure, a hard-selection approach is proposed to solve the ABSA task. Specifically, the hard-selection approach needs to learn to detect the corresponding opinion snippet $O=\{w_l, w_{l+1}, \ldots, w_r\}$ 615, wherein $1 \le l \le r \le N$, and l is the start position in the sentence, r is the end position in the sentence, and then use O to predict the sentiment for the given aspect. The network architecture is shown in FIG. 6.

Word-Aspect Fusion by BERT 600

Accurately modeling the relationships between sentence words and an aspect is important for the success of the ABSA task. Many methods have been developed to model the word-aspect relationships. Some prior arts simply concatenate the aspect embedding with the fed word embeddings and sentence hidden representations for computing aspect-specific attention weights. Some prior arts model the aspect and sentence interactively by using two attention networks or adopting circular convolution of vectors for performing word-aspect fusion.

According to one embodiment of the present disclosure, BERT is used to model the deep associations between the sentence words and the aspect. BERT is a powerful pre-trained model which has achieved remarkable results in many natural language processing (NLP) tasks. The architecture of BERT is a multi-layer bidirectional transformer encoder, which uses the self-attention mechanism to capture complex interaction and dependency between terms within a sequence. To leverage BERT to model the relationships between the sentence and the aspect, the sentence and the aspect are packed together into a single sequence and then fed into BERT 600, as shown in FIG. 6, wherein [CLS] 603 means the special token for classification, $E_{[CLS]}$ 607 means token embedding, C 610 is the final hidden vector corresponding to the first input token [CLS] as the aggregate representation, which is used to predict the classification label, [SEP] 604 means a special token for separating two sentences, $E_{[SEP]}$ 608 means word embedding, $E_1 \ldots E_N$ 605 are word embeddings of the sentence, $E_1' \ldots E_M'$ 606 are word embeddings of the aspect, T means final representation (embedding), and $T_1 \ldots T_N$ 611 are the word final representations of the sentence, $T_{[SEP]}$ is word final representation, $T_1' \ldots T_N'$ 613 are the word final representations of the aspect, and 609 are nodes of the BERT model. Those skilled in the art could refer to any proper introduction of BERT for more information. With this sentence-aspect concatenation, both the word-aspect associations and word-word dependencies are modeled interactively and simultaneously. With the contextual token representations 614 $T_S = T_{[1:N]} \in \mathbb{R}^{N \times H}$ of the sentence, wherein N is the sentence length and H is the hidden size, $T_{[1:N]}$ is the combination vector of the word final representations of the sentence, $\mathbb{R}$ means real, and $\mathbb{R}^{N \times H}$ is a N×H real matrix. Then the start and end positions of the opinion snippet could be determined in the sentence based on $T_S$.

Soft-Selection

To fairly compare the performance of soft-selection approaches with hard-selection approaches, the same word-aspect fusion results $T_S$ from BERT could be used. The attention mechanism by adopting the approach as following:

$$\alpha = \mathrm{softmax}(v_1 \tanh(W_1 T_S^T))$$

$$g = \alpha T_S \quad (1),$$

wherein $v_1 = \mathbb{R}^H$ and $w_1 \in \mathbb{R}^{H \times H}$ are the parameters, and a is the attention weight vector. The normalized attention weights are used to softly select words from the whole sentence and generate the final aspect-specific sentence representation g. Then the sentiment prediction could be calculated as follows:

$$\hat{y} = \mathrm{softmax}(W_2 g + b) \quad (2),$$

wherein $W_2 \in \mathbb{R}^{C \times H}$ and $b \in \mathbb{R}^C$ are the weight matrix and bias vector respectively, and $\hat{y}$ is the probability distribution on C polarities. The polarity with highest probability is selected as the prediction.

Hard-Selection 620

According to one embodiment of the present disclosure, the hard-selection approach determines the start and end positions of the opinion snippet and selects the words between these two positions for sentiment prediction. Since there is no ground-truth opinion snippet, but only the polarity of the corresponding aspect, a reinforcement learning is adopted to train the model, wherein the reinforcement learning is a traditional machine learning model for taking suitable action to maximize reward in a particular situation. To make sure that the end position comes after the start position, the start and end sequentially are determined as a sequence training problem. The parameters of the network θ define a policy pθ and output an action that is the prediction of the position. According to one embodiment of the present disclosure, two actions are generated for determining the start and end positions respectively for simplicity. After determining the start position, the "state" is updated and then the end position is conditioned on the start position.

According to one embodiment of the present disclosure, a trained start vector is defined as $s \in \mathbb{R}^H$ and a trained end vector as $e \in \mathbb{R}^H$. The probability of a word being the start of the opinion snippet is computed as a dot product between its contextual token representation and s followed by a softmax over all of the words of the sentence as follows:

$$\beta_l = \mathrm{softmax}(T_S s) \quad (3).$$

The start position l is determined by sampling based on the multinomial distribution $\beta_l$. To guarantee the end comes after the start, the end is sampled only in the right part of the sentence after the start, however those skilled in the arts would understand the end could be sampled in the left part of the sentence after the start or be sampled at the below part of the sentence according to different reading culture. Therefore, the state is updated by slicing operation $T_S^r = T_S[l:]$. Similar to the start position, the end position r is also sampled based on the multinomial distribution $\beta_r$:

$$\beta_r = \mathrm{softmax}(T_S^r e) \quad (4).$$

Then the opinion snippet $T_O = T_S[l:r]$ is obtained to predict the sentiment polarity of the given aspect in the sentence. The probabilities of the start position at l and the end position at r are $p(l) = \beta_l[l]$ and $p(r) = \beta_r[r]$ respectively.

Reward 630

After the opinion snippet $T_O$ is obtained by the sampling of the start and end positions, the final representation $g_o$ is calculated by the average of the opinion snippet, $g_o = \mathrm{avg}(T_O)$. Then equation 2 with different weights is applied for computing the sentiment prediction $\hat{y}_o$. A cross entropy loss function is employed for computing the reward R as follows:

$$R = -\Sigma_c y^c \log \hat{y}_o^c \quad (5),$$

wherein c is the index of the sentiment polarity class and y is the ground truth, $y^c$ is the ground-truth value of the class c, and $\hat{y}_o^c$ is the predicted value of the class c.

Self-Critical Training

According to one embodiment of the present invention, a reinforcement learning is leveraged to learn the start and end positions. The goal of training is to minimize a negative expected reward as shown below:

$$L(\theta) = -R \cdot p(l) \cdot p(r) \quad (6),$$

wherein θ is all the parameters in the architecture of the invention, which includes the base method BERT, the position selection parameters(vectors) {s, e}, and the parameters for sentiment prediction and then for reward calculation, L(θ) is the loss function, and R is the reward. Therefore, the state in the method is the combination of the sentence and the aspect. For each state, the action space is every position of the sentence.

To reduce the variance of the gradient estimation, the reward is associated with a reference reward or baseline $R_b$. With the likelihood ratio trick, the objective function can be transformed as:

$$L(\theta) = -(R - R_b) \cdot (\log(p(l)) + \log(p(r))) \quad (7).$$

The baseline $R_b$ is computed based on the opinion snippet determined by the baseline policy, which selects the start and end positions greedily by the argmax operation on the softmax results. As shown in FIG. 6, the reward R is calculated by sampling the opinion snippet, while the baseline $R_b$ is computed by greedily selecting the baseline snippet $T_o^b$ 617 based on the baseline contextual token representations $T_S^b$ 616. Note that in the test stage, the snippet is determined by well-known argmax for inference.

Visualization of Experimental Results of Embodiments

Figure 7:
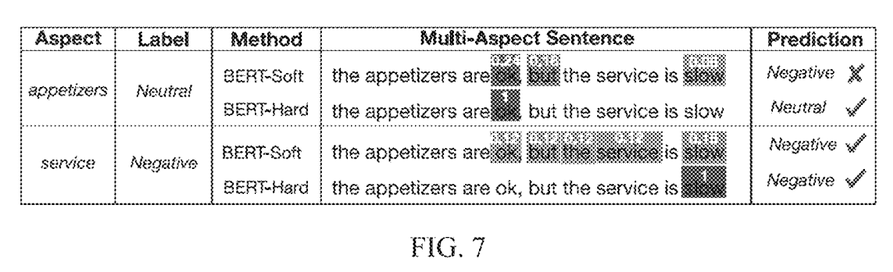
FIG. 7 depicts the visualization of experimental results of embodiments of the present invention.

In this section, the attention weights for BERT-Soft and opinion snippets for BERT-Hard could be visualized to show the experimental results of embodiments of the present invention. As demonstrated in FIG. 7, which depicts the visualization of experimental results of embodiments of the present invention, the multi-aspect sentence "the appetizers are OK, but the service is slow" belongs to category Diff, wherein Diff is used to indicate multiple aspects contained in a sentence with emotional inconsistency, such as one aspect is positive, and another one is negative. In FIG. 7, the attention weights are visualized for BERT-Soft, the selected opinion snippets are marked for BERT-Hard, and the correctness of the predicted results is also marked with an "X" for wrong results and with a checkmark for right results.

Firstly, the attention weights of BERT-Soft scatter along the whole sentence and could attend to irrelevant words. For the aspect service, BERT-Soft attends to the word "ok" with relatively high score though it does not describe the aspect service. This problem also exists for the aspect appetizers. Furthermore, the attention distraction could cause error prediction. For the aspect appetizers, "but" and "slow" gain high attention scores and cause the wrong sentiment prediction as Negative.

Secondly, the method BERT-Hard according to an embodiment of the present invention can detect the opinion snippet for a given aspect. As illustrated in FIG. 7, the opinion snippets are selected by BERT-Hard accurately. In the sentence "the appetizers are ok, but the service is slow", BERT-Hard can exactly locate the opinion snippets "ok" and "slow" for the aspect appetizers and service respectively.

It should be pointed out that in the above embodiments of the present invention are described with BERT, however, it is only for a better understanding of the present invention thus will not adversely limit the scope of the invention. For example, those skilled in the art could leverage the methods of this invention based on any suitable models, it will not be discussed in detail for the purpose of simplifying illustration.

It should be noted that the processing of detecting opinion snippet for aspect-based sentiment analysis (or achieved by the system for detecting opinion snippet for aspect-based sentiment analysis) according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by one or more processing units, at least one sentence and at least one aspect; determining, by one or more processing units, at least one opinion snippet of the at least one sentence based on the at least one sentence and the at least one aspect, through a trained aspect-sentence fusion model that outputs at least one word-aspect fusion result, wherein determining the at least one opinion snippet further comprises:
   determining, by one or more processing units, a start position of the at least one opinion snippet in the at least one sentence based on the at least one word-aspect fusion result, and
   determining, by one or more processing units, an end position of the at least one opinion snippet in the at least one sentence based on the determined start position by sampling the end position in a later part of the at least one sentence after the start position of the at least one sentence; and
   calculating, by one or more processing units, a sentiment prediction of the at least one opinion snippet for the at least one aspect.

2. The method of claim 1, wherein the at least one aspect is an aspect category or one or more aspect terms.

3. The method of claim 1, wherein the aspect-sentence fusion model is bidirectional encoder representations from transformers (BERT).

4. The method of claim 1, wherein determining the start position comprises:
   computing, by one or more processing units, a multinomial distribution as a dot product between the at least one word-aspect fusion result and a trained start vector followed by a softmax over all the words of the at least one sentence; and
   sampling, by one or more processing units, the start position based on the multinomial distribution.

5. The method of claim 1, wherein calculating the sentiment prediction of the at least one opinion snippet comprises:
   obtaining, by one or more processing units, an average representation of the at least one opinion snippet; and
   calculating, by one or more processing units, the sentiment prediction based on the average representation.

6. The method of claim 4, wherein the trained start vector is learned, by one or more processing units, through a reinforcement learning based on training data with sentences, aspects, and corresponding labeled sentiment classifications.

7. A computer system, comprising:
   a processor;
   a computer-readable memory coupled to the processor, the memory comprising instructions that when executed by the processor perform actions of:
   receiving at least one sentence and at least one aspect;
   determining at least one opinion snippet of the at least one sentence based on the at least one sentence and the at least one aspect, through a trained aspect-sentence fusion model that outputs at least one word-aspect fusion result, wherein determining the at least one opinion snippet comprises:
   determining a start position of the at least one opinion snippet in the at least one sentence based on the at least one word-aspect fusion result, and
   determining an end position of the at least one opinion snippet in the at least one sentence based on the determined start position by sampling the end position in a later part of the at least one sentence after the start position of the at least one sentence; and
   calculating a sentiment prediction of the at least one opinion snippet for the at least one aspect.

8. The computer system of claim 7, wherein the at least one aspect is an aspect category or one or more aspect terms.

9. The computer system of claim 7, wherein the trained aspect-sentence fusion model is bidirectional encoder representations from transformers (BERT).

10. The computer system of claim 7, wherein determining the start position comprises:
    computing a multinomial distribution as a dot product between the at least one word-aspect fusion result and a trained start vector followed by a softmax over all the words of the at least one sentence; and sampling the start position based on the multinomial distribution.

11. The computer system of claim 7, wherein calculating the sentiment prediction of the at least one opinion snippet comprises:

obtaining an average representation of the at least one opinion snippet; and calculating the sentiment prediction based on the average representation.

12. The computer system of claim 10, wherein the trained start vector is learned through a reinforcement learning based on training data with sentences, aspects, and corresponding labeled sentiment classifications.

13. A computer program product for aspect-based sentiment analysis, comprising a computer readable storage medium having program instructions embodied therewith, the program instructions executable by a processor to cause the processor to:

receive at least one sentence and at least one aspect;

determine at least one opinion snippet of the at least one sentence based on the at least one sentence, the at least one aspect and a trained aspect-sentence fusion model that outputs at least one word-aspect fusion result, wherein determine the at least one opinion snippet comprises:

determine a start position of the at least one opinion snippet in the at least one sentence based on the at least one word-aspect fusion result, and determine an end position of the at least one opinion snippet in the at least one sentence based on the determined start position by sampling the end position in a later part of the at least one sentence after the start position of the at least one sentence; and calculate a sentiment prediction of the at least one opinion snippet for the at least one aspect.

14. The computer program product of claim 13, wherein the trained aspect-sentence fusion model is bidirectional encoder representations from transformers (BERT).

\* \* \* \* \*